Patented Dec. 30, 1941

2,268,121

UNITED STATES PATENT OFFICE 2,268,121

COATED FABRIC

William P. Kingsley, Newburgh, N. Y., assignor to E. I. du Pont de Nemours & Company, Wilmington, Del., a corporation of Delaware No Drawing. Application August 31, 1940, Serial No. 355,033

4 Claims. (Cl. 91—68)

This invention relates to coated and impregnated fabrics and more particularly to woven fabrics coated or impregnated with a composition containing a resin and certain modifying agents.

Heretofore it has been customary to coat fabrics with compositions containing cellulose derivatives, resins, rubber, oils, and the like for certain purposes. The type of composition varies according to the purpose for which the fabric is coated; for example, if it is desired to render a fabric waterproof, rubber compounds would probably be selected. Such a coated fabric is usually heavy and is suited to relatively rough usage. For light weight moistureproof fabrics a silk base is sometimes coated with raw or treated oils to produce material known as "oiled silk" fabrics. Such products are used extensively for raincoats, capes, tobacco pouches, umbrellas, bowl covers, refrigerator bags, and the like. These oiled silk products, however, have certain disadvantages among which may be mentioned their odor and tendency to become stiff when subjected to low temperatures, and this tendency may be sufficient to crack the coating on folding. Another disadvantage of such a fabric is the expense involved in drying or curing the impregnated fabric to produce a dry surface. A still further disadvantage is that water-white coatings cannot be produced economically.

A disadvantage with the other types of compositions is that where a large proportion of solvent plasticizer is used in combination with a cellulose derivative or a resin having thermoplastic tendencies, they become sticky when subjected to steam or hot water. This property precludes their use as shower curtains or any other use in which they are subjected to high temperatures such as sunshine, hot water, and the like.

It is, therefore, an object of this invention to produce a coated or impregnated fabric which is substantially water-white in color, is waterproof, has no odor, and does not become sticky at reasonably high temperatures. Another object is to produce an impregnated fabric which does not crack on folding at low temperatures and is economical to manufacture. Other objects will become apparent as the description of the invention proceeds.

These and other objects are accomplished by coating a suitable fabric with a composition containing a polyvinyl alcohol butyraldehyde resin modified with a hard resin such as certain urea formaldehyde resins, a plasticizer, a wax, and a suitable solvent, all in certain definite proportions. The butyraldehyde resin may be produced by the methods disclosed in U. S. Patent No. 2,162,678, which issued to Robertson June 13, 1939. The present invention may be considered as a modification of this patent in which the resins disclosed are combined with certain other ingredients to produce an impregnating composition which exhibits exceptional properties as disclosed above.

The invention may be more readily understood by the following examples which are given by way of illustration.

A light weight fabric is coated with a composition containing a modified polyvinyl alcohol butyraldehyde resin by means well known in the coating and impregnating art; as, for example, by spray coating, roller coating, doctor knife, by passing the fabric through the composition and pressing out any excess composition. This latter procedure impregnates the fabric whether it be a woven or non-woven type, in addition to applying a surface coating. Where the regular coating procedures are used the fabric may be coated on one or both sides, the choice depending upon the use for which the material is intended. After the coating composition has been applied, it is dried by any suitable means as, for example, by festooning in a heated chamber or simply passing through a suitably heated chamber such as that described in U. S. Patent 2,107,275, which issued to Anderson and Henry February 8, 1938. The drying means, time and temperature may be conveniently regulated to suit particular equipment used and other general manufacturing conditions. The following examples, in which the parts are by weight, illustrate the preferred compositions including the butyraldehyde resinous reaction products blended and softened with other materials. The numbers in parentheses indicate the percentages of the non-volatile components after the volatile components have been expelled.

Example I

| | Per cent |
|---|---|
| Polyvinyl alcohol butyraldehyde resin | 24.69 (60.1) |
| 10% solution of paraffin wax in toluol | 29.63 (7.2) |
| Sebacic di-ester of monobutyl ether of ethylene glycol | 13.42 (32.7) |
| Ethyl alcohol | 32.26 |

The butyraldehyde resin may be prepared in accordance with U. S. Patent 2,162,678. The sebacic di-ester of monobutyl ether of ethylene glycol in the above formula is present as a plasticizer for the butyraldehyde resin; the paraffin wax imparts a dry, waxy feel to the impregnated fabric which is highly desirable for those materials which are handled during use. A plurality of coats of the above composition was applied to dyed cotton sheeting fabric, running 7.00 yards per pound per 40" width by means of a doctor knife. After each successive coat the material was passed through a heated chamber to expel the volatile solvent. Sufficient composition was applied to deposit approximately 2.0 ounces of the non-volatile components of the composition per yard per 40" width. The impregnated material was soft and supple and had a dry feel. It was particularly suitable for raincoats, umbrellas, shower curtains, etc.

*Example II*

| | Per cent | |
|---|---|---|
| Polyvinyl alcohol butyraldehyde resin | 23.12 | (54.8) |
| 60% solution of urea formaldehyde monohydric alcohol resin in n-butyl alcohol* | 6.36 | (9.0) |
| 10% solution of paraffin wax in toluol | 27.74 | (6.5) |
| Sebacic di-ester of monobutyl ether of ethylene glycol | 12.57 | (29.7) |
| Ethyl alcohol | 30.21 | |

*This resin is prepared according to the disclosure of Edgar and Robinson, application Serial No. 58,000, filed January 7, 1936, now U. S. Patent 2,191,957.

The urea formaldehyde resin was added to the above formula to impart additional dryness to the impregnated fabric. An uncolored 4MM silk 36" wide was coated with the above composition by means of a doctor knife. Two coats were applied on one side and a single coat was applied on the other side. Sufficient composition was applied to deposit approximately 1.2 ounces per square yard. After each successive coat the material was passed through a heated chamber to expel the volatile components of the coating composition. The impregnated material was soft and supple and had a dry, wax-like feel. The impregnated fabric was particularly suitable for refrigerator bowl covers, refrigerator bags, shower curtains, etc.

Various types of fabrics may be coated with compositions of the invention. For example, in making a material similar to the so-called oiled silk but with improved properties, silks ranging from 2¾ to 12 momme may be used as well as various types and weights of fabrics made of synthetic yarns, such as cellulose acetate, viscose, and cuprammonium cellulose. Cotton fabrics of various weights and weaves can be conveniently coated or impregnated with the compositions. Further, yarns, cords, etc. of various animal and vegetable fibres, as well as felted materials of various types may be treated with the compositions of the invention. The amount of composition applied to the fabric may vary over a wide range and will be largely governed by the weight and type of fabric being treated as well as the particular use for which the finished product is intended.

In order to obtain all the advantages mentioned in the objects of the invention, it is necessary to observe certain limits with respect to the amount and kind of plasticizer and amount of wax in the compositions. When the plasticizer is dibutyl sebacate, diamyl adipate, dibutyl adipate, tricresyl phosphate, the phthalic di-ester of mono-butyl ether of ethylene glycol, or the sebacic di-ester of monobutyl ether of ethylene glycol, it has been found that the plasticizer should be present between about 30 and 65% of the butyral resin. If the amount of plasticizer is substantially less than 30%, the coated fabric may rattle and feel like paper or even be brittle in cold weather, whereas if more than 65% is used, the material may become sticky at elevated temperatures and would not be resistant to washing in hot water. The wax may vary between 8 and 18% of the butyral resin.

The compositions may be used as such to produce clear transparent coatings or they may be pigmented or dyed to produce colored coatings. The clear transparent coatings may be applied over fabrics having a solid color or a colored design printed thereon.

The paraffin wax in the compositions may be replaced by a number of other waxes such as, for example, carnauba, ceresin, spermaceti, montan and beeswax or blends thereof. Other plasticizers for the butyraldehyde resin such as, for example, dibutyl sebacate, diamyl adipate, dibutyl adipate, tricresyl phosphate, and phthalic di-ester of monobutyl ether of ethylene glycol are suitable.

The solvent type plasticizers for the butyraldehyde resin are preferred to the non-solvent plasticizers for the reason a greater quantity of the latter is required to produce the suppleness desired which results in a somewhat tacky surface.

Solvents other than ethyl alcohol mentioned in the examples may be used. However, a relatively low boiling solvent is preferred in order to facilitate the drying of the coating compositions.

Pigments, dyes, and other modifying agents may be added if desired, but not in amount sufficient to destroy the softness of the material.

The products of this invention possess as advantages over similar material made according to the present state of the art, improved initial flexibility, retention of pliability and resistance to cracking when subjected to reduced temperatures and retention of dry, wax-like feel in hot moist atmosphere. Other advantages include translucency and a so-called water-white color and a marked resistance to cracking on folding and abrasion in service. A still further advantage is the absence of odor of the coating composition.

As many apparently widely different embodiments of this invention may be made without departing from the spirit and scope thereof, it is to be understood that the invention is not to be limited to the specific embodiments thereof except as defined in the appended claims.

I claim:

1. A coated fabric comprising a light flexible base having a dry, supple coating which retains its suppleness at reduced temperatures, comprising a vinyl alcohol butyraldehyde resin, a plasticizer for the said resin in amount between 30 and 65% of the said resin, said plasticizer selected from the group consisting of dibutyl sebacate, diamyl adipate, dibutyl adipate, tricresyl phosphate, and phthalic ester of monobutyl ether of ethylene glycol, sebacic ester of monobutyl ether of ethylene glycol, and a wax in amount between about 8 and 18% of the resin.

2. An article of manufacture comprising a light-weight fabric having a dry, supple, colorless, transparent coating which retains its suppleness at reduced temperatures, said coating having the following approximate composition: vinyl alcohol butyraldehyde resin 54.8 parts, urea formaldehyde resin 9.0 parts, paraffin wax 6.5 parts, and sebacic ester of monobutyl ether of ethylene glycol 29.7 parts.

3. The method of preparing a dry, supple coated fabric having approximately the suppleness of an uncoated fabric which comprises coating a cotton sheeting weighing about one pound per 7 yards of 40" material, applying a plurality of coats of a composition comprising a vinyl alcohol butyraldehyde resin, sebacic ester of monobutyl ether of ethylene glycol in amount between 30% and 65% of said resin and a wax in amount between about 8 and 18% of said resin until two ounces per yard of non-volatile components have been applied, and thereafter allowing the solvents to evaporate.

4. A treated fabric suitable for raincoats and the like comprising a light weight fabric, having a dry supple coating, said coating having the following approximate composition: polyvinyl alcohol butyraldehyde resin 60.1 parts, paraffin wax 7.2 parts and sebacic diester of monobutyl ether of ethylene glycol 32.7 parts.

WILLIAM P. KINGSLEY.